(12) United States Patent
Srinivas et al.

(10) Patent No.: US 11,216,659 B2
(45) Date of Patent: Jan. 4, 2022

(54) CONVERTING TABLE DATA INTO COMPONENT PARTS

(71) Applicant: KPMG LLP, New York, NY (US)

(72) Inventors: Raghuram Srinivas, Frisco, TX (US); Marisa Ferrara Boston, Denver, CO (US); Vishnu Muralidharan, Woodbridge, NJ (US); Seth Harsh, Chicago, IL (US)

(73) Assignee: KPMG LLP, New York, NY (US)

( * ) Notice: Subject to any disclaimer, the term of this patent is extended or adjusted under 35 U.S.C. 154(b) by 94 days.

(21) Appl. No.: 16/741,283

(22) Filed: Jan. 13, 2020

(65) Prior Publication Data

US 2021/0216761 A1 Jul. 15, 2021

(51) Int. Cl.
*G06K 9/00* (2006.01)
*G06F 16/25* (2019.01)
*G06K 9/62* (2006.01)

(52) U.S. Cl.
CPC ....... *G06K 9/00449* (2013.01); *G06F 16/258* (2019.01); *G06K 9/00456* (2013.01); *G06K 9/00463* (2013.01); *G06K 9/6215* (2013.01); *G06K 9/6218* (2013.01); *G06K 2209/01* (2013.01)

(58) Field of Classification Search
CPC .......... G06K 9/00449; G06K 9/00456; G06K 9/00463; G06K 9/6215; G06K 9/6218; G06K 2209/01; G06F 16/258
USPC ................................................. 382/224, 225
See application file for complete search history.

(56) References Cited

U.S. PATENT DOCUMENTS

| | | | |
|---|---|---|---|
| 2017/0351677 A1* | 12/2017 | Chaubal | G06F 16/248 |
| 2018/0210925 A1* | 7/2018 | Raghavan | G06F 17/18 |
| 2019/0102620 A1* | 4/2019 | Siddiq | G06K 9/00469 |
| 2019/0340240 A1* | 11/2019 | Duta | G06F 40/177 |
| 2020/0097759 A1* | 3/2020 | Nadim | G06F 40/177 |

* cited by examiner

*Primary Examiner* — Daniel G Mariam
(74) *Attorney, Agent, or Firm* — Nelson Mullins Riley & Scarborough LLP; Anthony A. Laurentano

(57) ABSTRACT

A system and method of processing source data that includes table data by converting the table data into machine encoded text data having associated therewith text coordinate data having a Y-axis component and an X-axis component, and then generating from the machine encoded text data a plurality of pixels along the Y-axis component and the X-axis component. The system then performs a clustering technique on the plurality of pixels to generate a plurality of clusters of pixels based on similar attributes, and classifying each of the plurality of clusters of pixels as a selected row of the table and as a selected column of the table, thus making available the information encoded in the table for subsequent processing.

38 Claims, 12 Drawing Sheets

FIG. 8

COMPARATIVE EMPLOYMENT STATISTICS

| Year/Region Employment (000s) or Unemployment Rate | Los Amgeles/Long Beach/Riverside CSA(Combined Statistical Area) Unemployment Rate | State of California Unemployment Rate | United States Unemployment Rate |
|---|---|---|---|
| 2005 | 5.4% | 5.0% | 5.1% |
| 2006 | 4.9% | 4.5% | 4.6% |
| 2007 | 5.4% | 5.0% | 4.6% |
| 2008 | 7.3% | 7.3% | 5.8% |
| 2009 | 11.2% | 11.2% | 9.3% |
| 2010 | 12.2% | 12.2% | 9.6% |
| 2011 | 11.7% | 11.7% | 8.9% |
| 2012 | 10.4% | 10.4% | 8.1% |
| 2013 | 8.9% | 9.1% | 7.4% |
| 2014 | 7.5% | 7.7% | 6.2% |
| Aug 2015.5 (P) | 6.1% | 6.4% | 5.2% |
| Source: Bureau of Labor Statistics | | | |

US 11,216,659 B2

CONVERTING TABLE DATA INTO COMPONENT PARTS

BACKGROUND OF THE INVENTION

The present invention is related to a data processing system for processing source data, and is more specifically related to identifying the component parts of one or more tables present within the source data using the data processing system.

Many companies today are required to provide and disclose financial related information to their accounting and financial advisors. The accounting advisors often receive from their client companies voluminous amounts of financial data, in disparate forms and formats, that must be handled and processed accordingly. This creates an enormous strain on the resources of the accounting advisors.

The financial information is often provided to the accounting advisors in both digital and non-digital formats. Regardless of the manner of disclosure, the accounting advisors need to process and review the disclosed information so as to prepare the necessary financial disclosure documents, such as tax returns, 10-K documents and the like. Oftentimes, a significant portion of the disclosed financial data is provided in a tabular format, which is difficult to process in a digital manner and is also difficult to retrieve data therefrom at a later time. This drawback occurs since current software systems have a difficult time recognizing the table data, and in the off chance that portions of the table data are recognized, disassembling the tables into their components parts for further processing is quite difficult.

As such, the conventional processing and handling methodology requires that the accounting advisors manually review the disclosed financial information and then manually input into a computer system the relevant and pertinent financial data. This process is time consuming and expensive.

SUMMARY OF THE INVENTION

An object of the present invention is to digitally process source data that includes financial information by digitally recognizing the presence of tables therein, disassembling the tables into their component parts (e.g., rows and columns), extracting the associated financial data therefrom, and then using the extracted data in preparing the necessary financial documents.

The present invention is directed to a system and method for digitally processing and recognizing financial information presented in a tabular format. The invention includes digitizing the input source data, which can include financial related information presented in a tabular format, pixelating the input information into coordinate data (e.g., X and Y axis coordinate data), clustering together similar data into clusters of pixels, processing the coordinate data along one or more of the coordinate axes, and then classifying the data as corresponding to a row of the table and/or a column of the table. The present invention also contemplates processing the resultant table data to determine the header rows forming part of the table data.

The present invention is thus directed to a data processing system for processing source data that includes table data, wherein the table data has associated therewith a plurality of rows and a plurality of columns. The system includes a conversion unit for converting the table data into machine encoded text data having associated therewith text coordinate data, wherein the coordinate data has a Y-axis component and an X-axis component; a pixelation unit for generating from the machine encoded text data a plurality of pixels along the Y-axis component or the X-axis component, wherein the plurality of pixels can have one or more attributes associated therewith; a clustering unit for receiving the plurality of pixels from the pixelation unit and in response thereto performing a clustering technique thereon to generate a plurality of clusters of pixels by clustering together one or more pixels from the plurality of pixels according to a similarity of the one or more attributes; a computation unit for processing the plurality of clusters of pixels and for determining a maximum extent and a minimum extent for each of the plurality of clusters of pixels; and a classification unit for classifying each of the plurality of clusters of pixels received from the computation unit as a selected one of the plurality of rows of the table or a selected one of the plurality of columns of the table, where the maximum and minimum extents of each of the plurality of clusters of pixels correspond to a width of one of the plurality of columns of the table data or a height of one of the plurality of rows of the table data.

The preprocessing unit is configured for cropping the source data to identify the table data and the conversion unit is configured to convert the table data into the machine encoded text data using an optical character recognition technique.

The pixelation unit comprises a Y-axis converter for selecting and converting the machine encoded data into the plurality of pixels along the Y-axis component, and an X-axis converter for selecting and converting the machine encoded data into the plurality of pixels along the X-axis component. Further, each of the Y-axis converter and the X-axis converter includes a border determination unit for forming a border around the machine encoded text data, and a filling unit for providing additional pixels to the plurality of pixels.

The clustering technique employed by the present invention comprises a density clustering technique, and the one or more attributes associated with the plurality of pixels comprises at least one of coordinate data and distance data representative of a distance between one or more pixels of the plurality of pixels.

The computation unit of the present invention includes a Y-axis calculation unit for determining the maximum and minimum extents for each of the plurality of rows in the table data, and an X-axis calculation unit for determining the maximum and minimum extents for each of the plurality of columns in the table data. The Y-axis converter of the pixelation unit processes the machine encoded text data along the Y-axis component to generate the plurality of pixels along the Y-axis component, wherein the attribute of the plurality of pixels includes the Y-axis component and wherein each of the plurality of clusters of pixels generated by the clustering unit is associated with the plurality of rows of the table data. The Y-axis calculation unit of the computation unit receives the plurality of clusters of pixels and determines the minimum and maximum extents for each of the plurality of rows, and the classification unit classifies each of the plurality of clusters as one of the plurality of rows of the table data.

According to another aspect of the present invention, the classification unit generates row identification data associated with each one of the plurality of rows of the table data, and the pixelation unit receives and processes the row identification data with the X-axis converter along the X-axis component to determine the plurality of pixels along the X-axis component. The clustering unit processes the plurality of pixels along the X-axis component using the clustering technique to generate a plurality of clusters of pixels along the X-axis component by clustering together one or more pixels from the plurality of pixels, and the X-axis calculation unit of the computation unit determines the maximum and minimum extents for each of the plurality of clusters of pixels along the X-axis for determining the maximum and minimum extents for each of the plurality of columns in the table data.

Further, each of the plurality of columns and the plurality of rows of the table data have a text cell with text data associated therewith, and the X-axis calculation unit further determines the text data present in each of the text cells of each of the columns to be clustered together and determines the clusters that belong in a different column. The X-axis calculation unit also determines the number of pixels required to represent a single text character (A) in each row of the plurality of rows using the following formula: A=avg number of pixels/length of token, where A is the number of pixels that represent a single character and the token corresponds to a word portion of the text data in the row. The X-axis calculation unit 54 is further adapted to determine a pixel length for each token in a row (B), and merge together clusters of pixels within a 2B distance of each other so as to place the tokens within the same column. The X-axis calculation unit further processes the cluster of pixels and determines the maximum extent and the minimum extent for each column of the plurality of columns, and the classification unit classifies each cluster of pixels as a column in the table data.

The classification unit generates row identification data corresponding to the plurality of rows and column identification data corresponding to the plurality of columns, and the system further comprises a table header and identification sub-system for identifying one or more header rows from among the plurality of rows. The table header and identification sub-system comprises an extraction unit for extracting row data from the row identification data and the column identification data and assigning a data type to each row of the plurality of rows, an estimation unit for estimating a similarity between the data types for each row of the plurality of rows, and an identification unit for identifying the rows with similar data types and identifying the rows with non-similar data types, and designating the rows with non-similar data types as header rows. The extraction unit comprises means for implementing a Jaccard similarity technique to extract the row data.

According to another aspect of the present invention, the data processing system processes source data that includes table data, and the table data has associated therewith a plurality of rows and a plurality of columns. The system includes a conversion unit for converting the table data into machine encoded text data having associated therewith text coordinate data, where the coordinate data has a Y-axis component and an X-axis component; a pixelation unit for generating from the machine encoded text data a plurality of pixels along the Y-axis component, where the plurality of pixels can have one or more attributes associated therewith; a clustering unit for receiving the plurality of pixels from the pixelation unit and in response thereto performing a clustering technique thereon to generate a plurality of clusters of pixels by clustering together one or more pixels from the plurality of pixels according to a similarity of the one or more attributes; a computation unit for processing the plurality of clusters of pixels and for determining a maximum extent and a minimum extent for each of the plurality of clusters of pixels; and a classification unit for classifying each of the plurality of clusters of pixels received from the computation unit as a selected one of the plurality of rows of the table, and wherein the maximum and minimum extents of each of the plurality of clusters of pixels correspond to a width of one of the plurality of columns of the table.

The present invention is also directed to a method of processing source data that includes table data, wherein the table data has associated therewith a plurality of rows and a plurality of columns, comprising converting the table data into machine encoded text data having associated therewith text coordinate data, wherein the coordinate data has a Y-axis component and an X-axis component; generating from the machine encoded text data a plurality of pixels along the Y-axis component or the X-axis component, wherein the plurality of pixels can have one or more attributes associated therewith; performing a clustering technique on the plurality of pixels to generate a plurality of clusters of pixels by clustering together one or more pixels from the plurality of pixels according to a similarity of the one or more attributes; processing the plurality of clusters of pixels and determining a maximum extent and a minimum extent for each of the plurality of clusters of pixels; and classifying each of the plurality of clusters of pixels received from the computation unit as a selected one of the plurality of rows of the table or a selected one of the plurality of columns of the table, and wherein the maximum and minimum extents of each of the plurality of clusters of pixels correspond to a width of one of the plurality of columns of the table data or a height of one of the plurality of rows of the table data.

The method can also include cropping the source data to identify the table data, and then selecting and converting the machine encoded data into the plurality of pixels along the Y-axis component, or selecting and converting the machine encoded data into the plurality of pixels along the X-axis component.

The method of the present invention can also include determining the maximum and minimum extents for each of the plurality of rows in the table data, or determining the maximum and minimum extents for each of the plurality of columns in the table data. The method can further include processing the machine encoded text data along the Y-axis component to generate the plurality of pixels along the Y-axis component, wherein the attribute of the plurality of pixels includes the Y-axis component, associating each of the plurality of clusters of pixels with the plurality of rows of the table data, determining the minimum and maximum extents for each of the plurality of rows, and classifying each of the plurality of clusters as one of the plurality of rows of the table data.

According to another aspect, the method still further includes generating row identification data associated with each one of the plurality of rows of the table data, processing the row identification data along the X-axis component to determine the plurality of pixels along the X-axis component, processing the plurality of pixels along the X-axis component to generate a plurality of clusters of pixels along the X-axis component by clustering together one or more pixels from the plurality of pixels, and determining the maximum and minimum extents for each of the plurality of clusters of pixels along the X-axis for determining the maximum and minimum extents for each of the plurality of columns in the table data.

The plurality of columns and the plurality of rows of the table data each have a text cell with text data associated therewith. As such, the method of the present invention further includes determining the text data present in each of the text cells of each of the columns to be clustered together and determining the clusters that belong in a different column.

According to other aspects, the method includes determining the number of pixels required to represent a single text character (A) in each row of the plurality of rows using the following formula: A=avg number of pixels/length of token, where A is the number of pixels that represent a single character and the token corresponds to a word portion of the text data in the row. As such, the method can further include determining a pixel length for each token in a row (B), and merging together clusters of pixels within a 2B distance of each other so as to place the tokens within the same column.

The method of the invention can still further include processing the cluster of pixels and determining the maximum extent and the minimum extent for each column of the plurality of columns, and classifying each cluster of pixels as a column in the table data.

According to another aspect, the classification unit generates row identification data corresponding to the plurality of rows and column identification data corresponding to the plurality of columns. As such, the method further comprises identifying one or more header rows from among the plurality of rows, extracting row data from the row identification data and the column identification data and assigning a data type to each row of the plurality of rows, estimating a similarity between the data types for each row of the plurality of rows, and identifying the rows with similar data types and identifying the rows with non-similar data types, and designating the rows with non-similar data types as header rows.

The present invention is also directed to a table header identification system for processing table data having a plurality of rows and a plurality of columns and identifying one or more header rows from among the plurality of rows. The system includes an extraction unit for extracting row data corresponding to the plurality of rows from the table data and assigning a data type to each row of the plurality of rows; an estimation unit for estimating a similarity between the data types for each row of the plurality of rows; and an identification unit for identifying the rows with similar data types and identifying the rows with non-similar data types, and designating the rows with non-similar data types as header rows. The data types are associated with the type of data set forth in the table data.

The estimation unit comprises means for assigning a similarity coefficient to each row of the plurality of rows, and also includes means for implementing a Jaccard similarity coefficient technique to the row data. The similarity coefficient is a Jaccard coefficient. The identification unit clusters together the rows having similar similarity coefficients.

The present invention is further directed to a method for processing table data having a plurality of rows and a plurality of columns and identifying one or more header rows from among the plurality of rows, comprising extracting row data corresponding to the plurality of rows from the table data with an extraction unit and assigning a data type to each row of the plurality of rows; estimating a similarity between the data types for each row of the plurality of rows; and identifying the rows with similar data types and identifying the rows with non-similar data types, and designating the rows with non-similar data types as header rows.

The step of estimating further comprises assigning a similarity coefficient to each row of the plurality of rows. The step of identifying further comprises clustering together the rows having similar similarity coefficients.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 8 is an example table generated by the system of FIG. 1 from the input table data of FIG. 7 according to the teachings of the present invention.

DETAILED DESCRIPTION

The present invention is directed to converting source data, which can include for example financial data, into a usable form for subsequent use in financial reports. As used herein, the term "source data" can include any type of data from any suitable source that would benefit from being converted into a more usable form. The source data can include, for example, financial related data. The source data can be in hard copy or written form, such as in printed documents, or can be in digital file formats, such as in portable document format (PDFs), word processing file formats such as WORD documents, as well as other file formats including hypertext markup language (HTML) file formats and the like.

As used herein the term "financial data" can include any data that is associated with or contains financial or financial related information. The financial information can include information that is presented free form or in tabular formats and is related to data associated with financial, monetary, or pecuniary interests.

As used herein, the term "financial reports" is intended to include any statement or report that exists in any suitable format (e.g., printed or in digital file format) that sets forth or includes financial data, including, for example, tax returns, income statements, cash flow statements, balance sheets, 10-K statements, 10-Q statements, audit reports, annual reports, loan applications, credit history reports, invoices, and the like.

The system and method of the present invention is intended to receive source data that may include financial data, where the source or financial data includes data that is presented in tables or in a tabular format. The system and method identifies the rows and columns in the table using pixelation and clustering techniques. The pixelation technique transforms or converts the table data into pixel data having associated therewith coordinate data, and the clustering technique processes the text data (e.g., financial data) in the table cells and converts the text data into a series of pixels in a two-dimensional (2D) space, thus allowing the system to further identify the rows and columns in the table.

Figure 1:
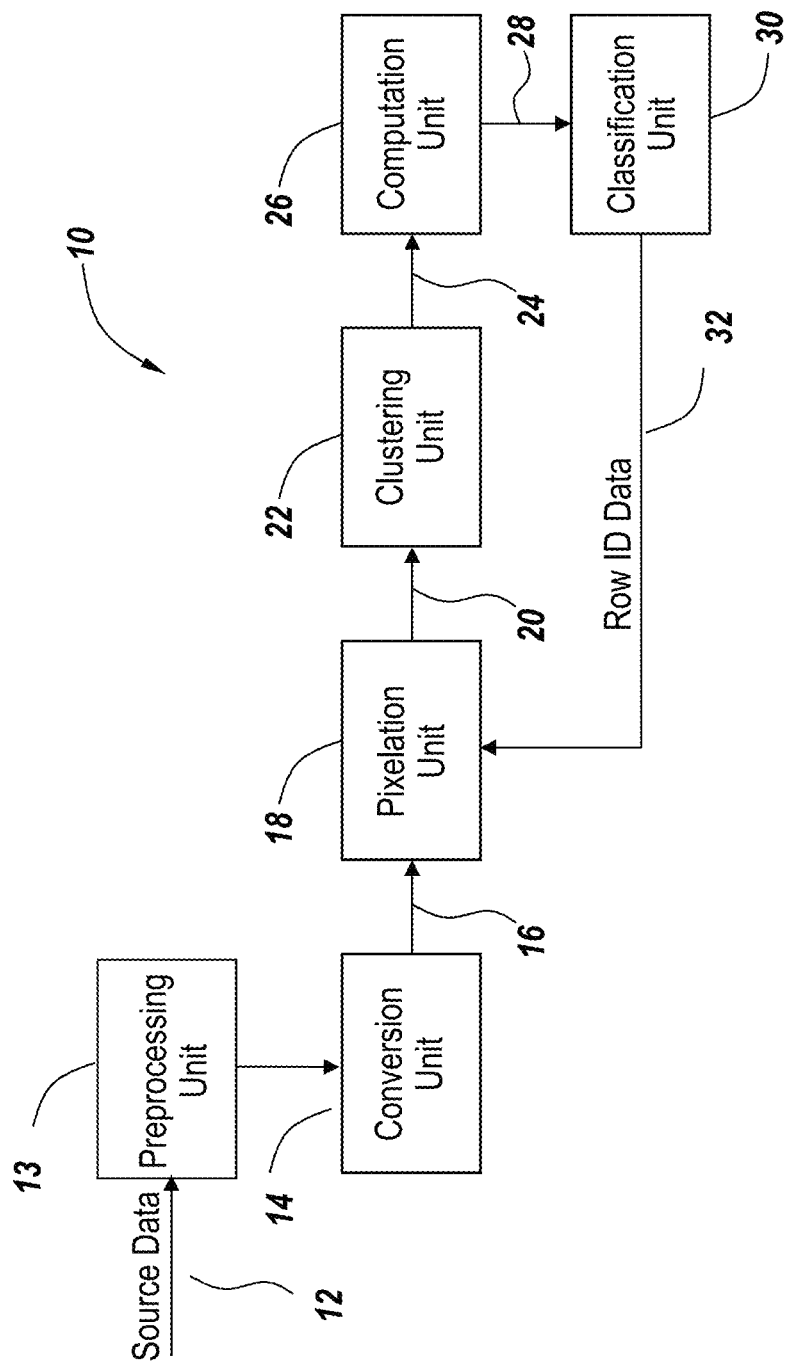
FIG. 1 is a schematic block diagram of a data conversion and identification system according to the teachings of the present invention.

FIG. 1 is a schematic block diagram of the data conversion and table identification system 10 according to the teachings of the present invention. The illustrated system 10 has a conversion unit 14 that converts through appropriate hardware and software an input source data 12 into digital machine encoded text data 16 that also includes associated coordinate data. The source data 12 can include any selected type of data and preferably includes financial data that includes one or more tables 110, FIG. 7, having table data associated therewith. The source data can be preprocessed by an optional preprocessing unit 13 so as to prepare the data for subsequent conversion by the conversion unit 14. For example, the preprocessing unit can employ suitable software, such as OpenCV and Luminoth, for identifying features or objects, such as tables, in the source data, according to known techniques. The Open CV software component of the preprocessing unit 13 pixelates the data to create a 300 dpi processed image of the source data. The pixelated image data is then processed by the Luminoth software component of the preprocessing unit 13 to identify the table. The identifies table object is then extracted from the source data using the OpenCV software component. The preprocessing unit 13 thus in essence prepares the source data, such as for example, by cropping the input source data so as to remove extraneous portions of the source data and leave the data associated with the table 110.

Figure 2:
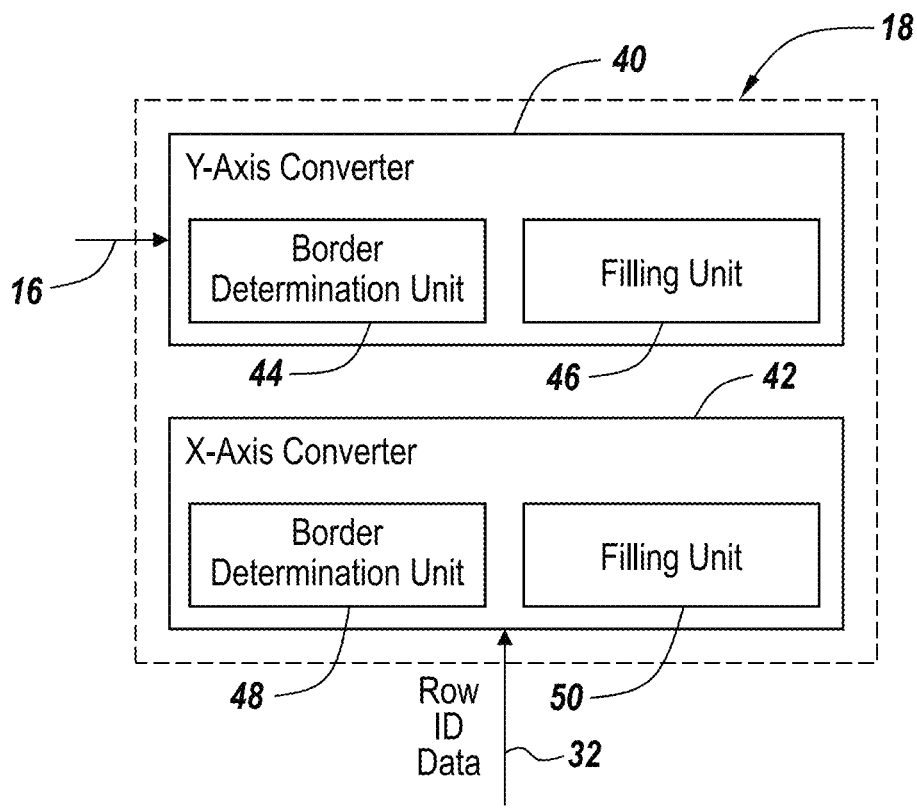
FIG. 2 is a schematic block diagram of the pixelation unit of FIG. 1 according to the teachings of the present invention.

The conversion unit 14 can employ any suitable and well known optical character recognition (OCR) hardware and software for converting the source data into machine encoded text data 16 that includes coordinate data. The conversion unit 14 thus treats the input table data similar to image data in a two-dimensional space. The coordinate data includes text data having a Y-axis component and an X-axis component. The converted or encoded text data 16 is then conveyed to a pixelation unit 18. The pixelation unit 18 converts the data 16 into a series of pixels along one or more of the coordinate axes. According to a preferred embodiment, the pixelation unit 18 converts the encoded text data 16 into pixels along the Y-axis by way of a Y-axis converter 40, as shown in FIG. 2. By selecting and converting the pixels along the Y-axis, the system 10 is in essence identifying the rows in a table that form part of the source data. One of ordinary skill in the art will readily recognize that the pixel conversion can also occur along the X-axis rather than the Y-axis so as to identify the columns in the table.

As shown in FIGS. 1 and 2, the Y-axis converter 40 can include a border determination unit 44 and a filling unit 46. The border determination unit 44 forms a border or frame, such as a bouding box, around the text in the table cells 116, FIG. 7. As is known, the bouding box can be a minimum bouding box where the box has the smallest dimensions where all of the text in the table cell 116 is enclosed therein. Since the coordinate system is two-dimensional, the bouding box can be a bouding rectangle. The filling unit 46 can be a morphological filling unit that fills any required or necessary white space within the bouding box with additional pixels. The pixelation unit 18 generates pixel data 20 related to the encoded text data 16, which includes table data, along one or more of the coordinate axes. The pixel data is then introduced to a clustering unit 22.

The illustrated clustering unit 22 is adapted or configured to perform a clustering technique on the pixel data 20. According to a preferred embodiment, the clustering unit 22 performs a density clustering operation using known density clustering algorithms, such as for example a density-based spatial clustering of applications with noise (DBSCAN). The clustering technique serves to cluster or gather together objects, such as pixels, that are within a certain distance of each other relative to objects or pixels in other clusters. Further, the pixel data 20 can have a selected number of attributes associated therewith. In the current embodiment, the attributes can be associated with the coordinate system data, including the X-axis data and the Y-axis data. As such, the pixels can be clustered together based on a similarity of the attributes in addition to the similarity of the distance relative to each other. That is, the similarity of the associated attributes results in selected distances between the pixels when plotted in vector space. The distances and attributes of the pixels are not disparate. The distances and the similarity of the attributes is determined or calculated by the distance between the points, where the lower or smaller the distances between the points equates to higher similarities and vice versa. When gathered together, the pixel clusters have a higher density of pixels than the remainder of the data set. Once the clusters are created and identified, the cluster related data 24 is conveyed to a computation unit 26 for further arithmetical computation. The clusters and the text associated with the clusters represent individual rows of the table. Those of ordinary skill in the art will readily recognize that other types of clustering techniques can also be employed by the clustering unit 22, such as K-means, centroid or hierarchical, connectivity, graph partitioning, and spectral clustering techniques.

Figure 3:
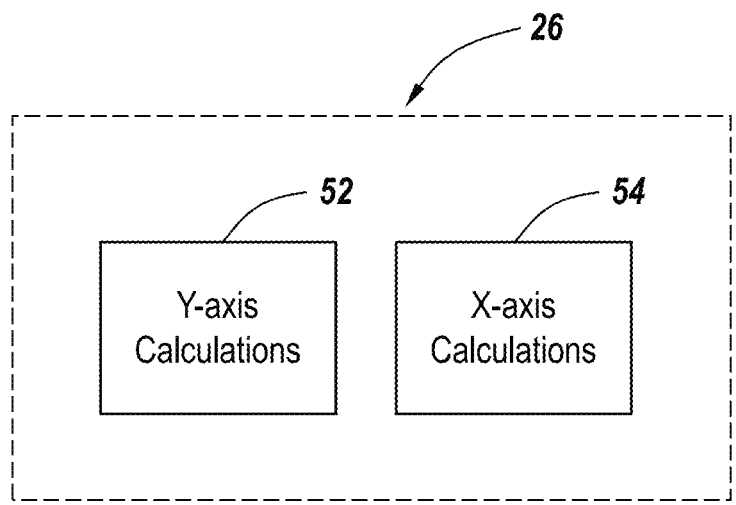
FIG. 3 is a schematic block diagram of the computation unit of FIG. 1 according to the teachings of the present invention.
Figure 4:
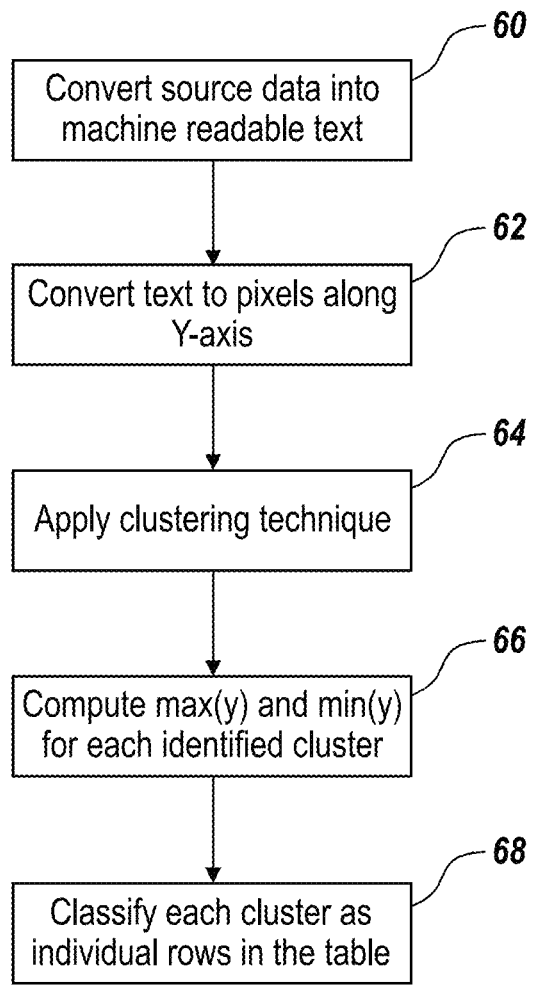
FIG. 4 is a schematic flow chart diagram illustrating the steps involved in the method for converting source data having table data into pixel data that can be subsequently clustered together and then classified as a row of the table according to the teachings of the present invention.

As shown in FIGS. 1 and 3, the computation unit 26 then determines the maximum and minimum extents for each identified cluster. For example, as shown in FIG. 3, the computation unit 26 can include a Y-axis calculation unit and an X-axis calculation unit 54. In the current embodiment, the clustering data 24 is conveyed to the Y-axis calculation unit 52, which calculates or determines the max(y) and min(y) for each identified cluster. The maximum and minimum Y-axis calculations define the endpoints or height of each row in the table. The computation unit 26 then generates cluster data 28 that is conveyed to a classification unit 30. The classification unit 30 processes the cluster data, including the max(y) and min(y) data and assigns each cluster to a selected row 112 in the table 118, FIG. 8. The classification unit 30 then generates row identification (ID) data 32 that is associated with the table 118, and then transmits the row ID data 32 to the pixelation unit 18 as part of a system feedback loop. The system 10 processes the row ID data 32 one row at a time so as to determine the constituent column data.

As shown in FIGS. 1-3, the row ID data 32 is then re-introduced to the pixelation unit 18. The row ID data 32 is processed by the X-axis converter 42 to identify the columns in the table portion of the source data 16. The X-axis converter 42 converts the row ID text data 32 into pixels along the X-axis. The X-axis converter 42 also includes a border determination unit 48 and a filling unit 50. The border determination unit 48 also forms a border or frame, such as a bouding box, around the text in the table cells. The filling unit 50 can also be a morphological filling unit that fills any required or necessary white space within the bouding box with additional pixels. The pixelation unit 18 generates pixel data 20 related to the row ID data, which includes table data, along the one or more coordinate axes, such as the X-axis component. The X-axis pixel data is introduced to the clustering unit 22, which applies a density based clustering technique. The clustering unit 22 clusters the pixels together based on the similarity of the associated attributes, such as the distance between clusters and the specific coordinate data. When gathered together, the pixels in the clusters of pixels have a higher density than the remainder of the data set. Once the clusters of pixels are created and identified, the cluster related data 24 is conveyed to the computation unit 26 for further arithmetical computation. In the computation unit 26, the X-axis clustering data is introduced to the X-axis calculation unit 54, which calculates or determines the max(x) and min(x) for each identified cluster. The maximum and minimum X-axis calculations define the endpoints or width of each column 114 in the table 118, FIG. 8. Further, the X-axis calculation unit 54 also determines which of the text present in the text cells of the columns 114 should be grouped or clustered together, and which clusters belong in a separate or different column. To achieve this, the X-axis calculation unit 54 initially determines the number of pixels required to represent a single character (A) in each row, using the following formula:

$$A = \text{avg number of pixels/length of token}$$

where A is the number of pixels that represent a single character and the "token" is a word in the row. The X-axis calculation unit 54 then determines the pixel lengths for each token in a row (B). With this information, the X-axis calculation unit 54 merges together any clusters within a 2B distance of each other. This serves to place the tokens (e.g., words) within the same column in the event that multiple words exist in the table cell 116. By determining the distance between adjacent tokens, the X-axis calculation unit 54 allows for the grouping together of tokens notwithstanding differences in font size and font style, which can impact the inter-cluster distance between adjacent clusters of pixels. The X-axis calculation unit processes the cluster data, and again determines the max(x) and min(x) for each column. The classification unit 30 then classifies and identifies each cluster as specific columns 114 in the table 118.

In operation, the data conversion and identification system 10 of the present invention processes source data having table data and then identifies the rows 112 and columns 114 in the table 110 that are present in the source data 12. As shown in FIGS. 1-5 and 7-8, the system 10 receives the source data 12 from any selected source, where the source data can preferably include financial data having one or more tables 110 in any selected format or arrangement. The source data 12 can initially be cropped by an optional preprocessing unit 13 by removing data that is separate and distinct from the table data from the source data 12. The source data 12 is then converted by the conversion unit 14 into machine encoded text data having selected attributes and coordinate data associated therewith, step 60. The coordinate data can correspond to two-dimensional cartesian coordinates having an X-axis component and a Y-axis component. The converted or machine encoded text data 16 is then converted to pixels by the pixelation unit 18 along one of the coordinate component axes, such as for example the Y-axis component, step 62. The pixel data along the Y-axis component is then processed using a clustering technique, such as by using a density based clustering technique. The pixel data is then clustered together into a series of clusters based on density, step 64. Each cluster of pixels and any text associated with each cluster represent individual rows 112 in the table 118. The min(y) and max(y) of the clustered pixels is then computed by the computation unit 26, and specifically by the Y-axis calculation unit 52, step 66. The min(y) and max(y) values correspond to the endpoints or extents of each row 112 and hence correspond to the height of each row 112 in the table 110. The cluster data 28 is then classified using a classification unit 30 into selected rows 112 of the table 118, step 68.

Figure 5:
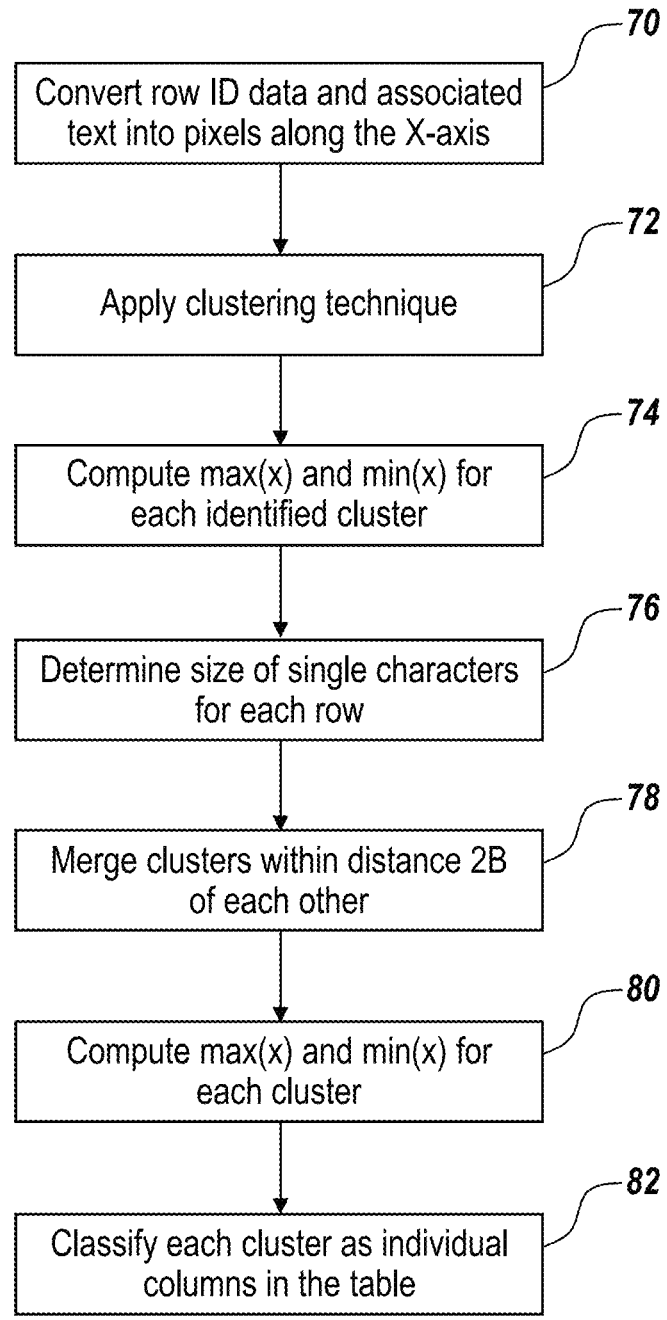
FIG. 5 is a schematic flow chart diagram illustrating the steps involved in the method for converting source data having table data into pixel data that can be subsequently clustered together and then classified as a column of the table according to the teachings of the present invention.
Figure 6:
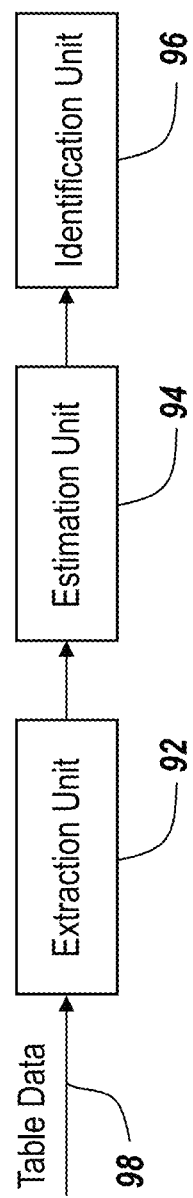
FIG. 6 is a schematic block diagram illustrating the system for determining table headers according to the teachings of the present invention.
Figure 7:
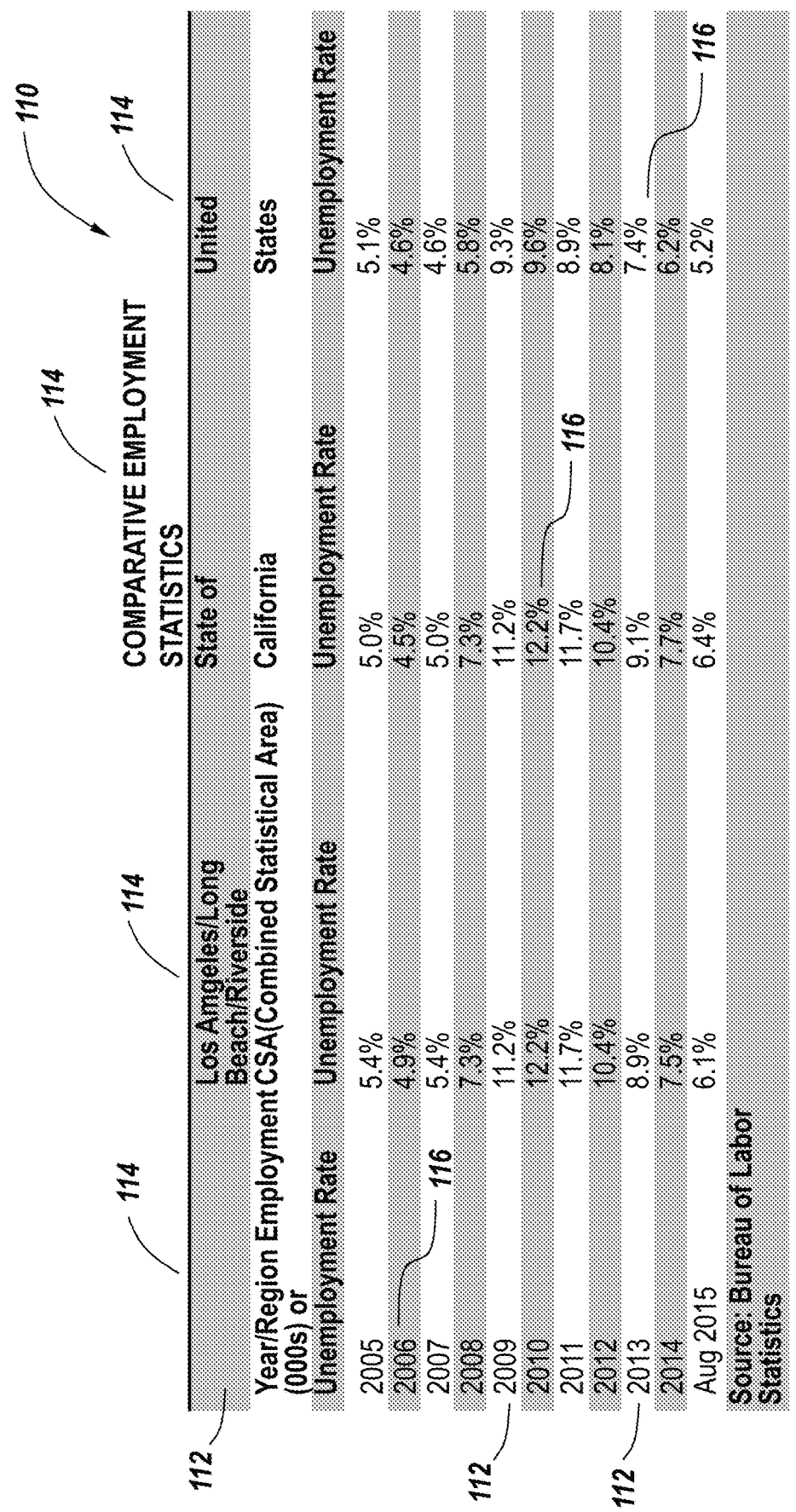
FIG. 7 is an example table forming part of the source data of the system of FIG. 1 according to the teachings of the present invention.

With reference to FIGS. 5 and 7-8, the row ID data 32 associated with each row 112 in the table 110 is then fed or transmitted back to the pixelation unit 18 of the system 10 so as to determine the columns 114 associated with each row 112. The X-axis converter 42 of the pixelation unit 18 processes the data to convert the row ID data 32 and associated text into pixels along the X-axis component, step 70. The pixel data is then clustered together by the clustering unit 22 using a density based clustering technique, step 72. The clustered pixel data is then processed by the X-axis calculation unit 54 of the calculation unit 26 to compute or calculate the min(x) and max(x) for each identified cluster of pixels. The min(x) and max(x) calculations define the endpoints or width of each column 114, step 74. The X-axis calculation unit 54 also determines the size of each token (e.g., word) for each row 112, step 76, and then merges selected clusters together that are within a selected distance of each other, such as twice the distance (e.g., 2B distance), step 78. This ensures that the proper data is associated with each table cell 116 in the table 118. The X-axis calculation unit 54 then determines or calculates once again the min(x) and max(x) for each identified cluster so as to once again determine the endpoints of the merged clusters, step 80. The classification unit 30 then classifies each cluster as specific or individual columns 114 in the table 118, step 82.

As shown in FIG. 7, the illustrated example table 110 forms part of the initial source data 12. The table 110 can set forth any type of information in associated text cells 116, and according to the current exemplary illustration sets forth financial data related to unemployment rates. The table 110 is processed by the data conversion and table identification system 10 of the present invention, and specifically the text associated with each table cell 116 is processed by the system 10. The table 110 can be initially presented in any selected format as part of the source data 12, and the system 10 is capable of processing the table data that is not presented in a standard or typical table format. As shown in FIG. 7, the illustrated table 110 is not presented in a typical table format in terms of having grid-lines delineating each row 112 and column 114 and hence enclosing each table cell 116. However, the system 10 is still capable of processing the table 110. FIG. 8 illustrates an example table 118 generated by the system 10 when processing the data associated with the table 110 according to the teachings of the present invention. The illustrated table 118 identifies the specific rows 112 and the specific text data and table cells 116 associated therewith. The system 10 then determines when processing each row ID data 32 the specific columns 114 that the text in the table cells 116 is associated therewith. As is evident, the system 10 identifies the table 110 and associated data in the source data 12, determines and identifies/classifies the appropriate number of rows 112 and columns 114, and then aligns or assigns the data in each table cell 116 to the appropriate rows and columns so as to be presented in the generated table 118.

Figure 9:
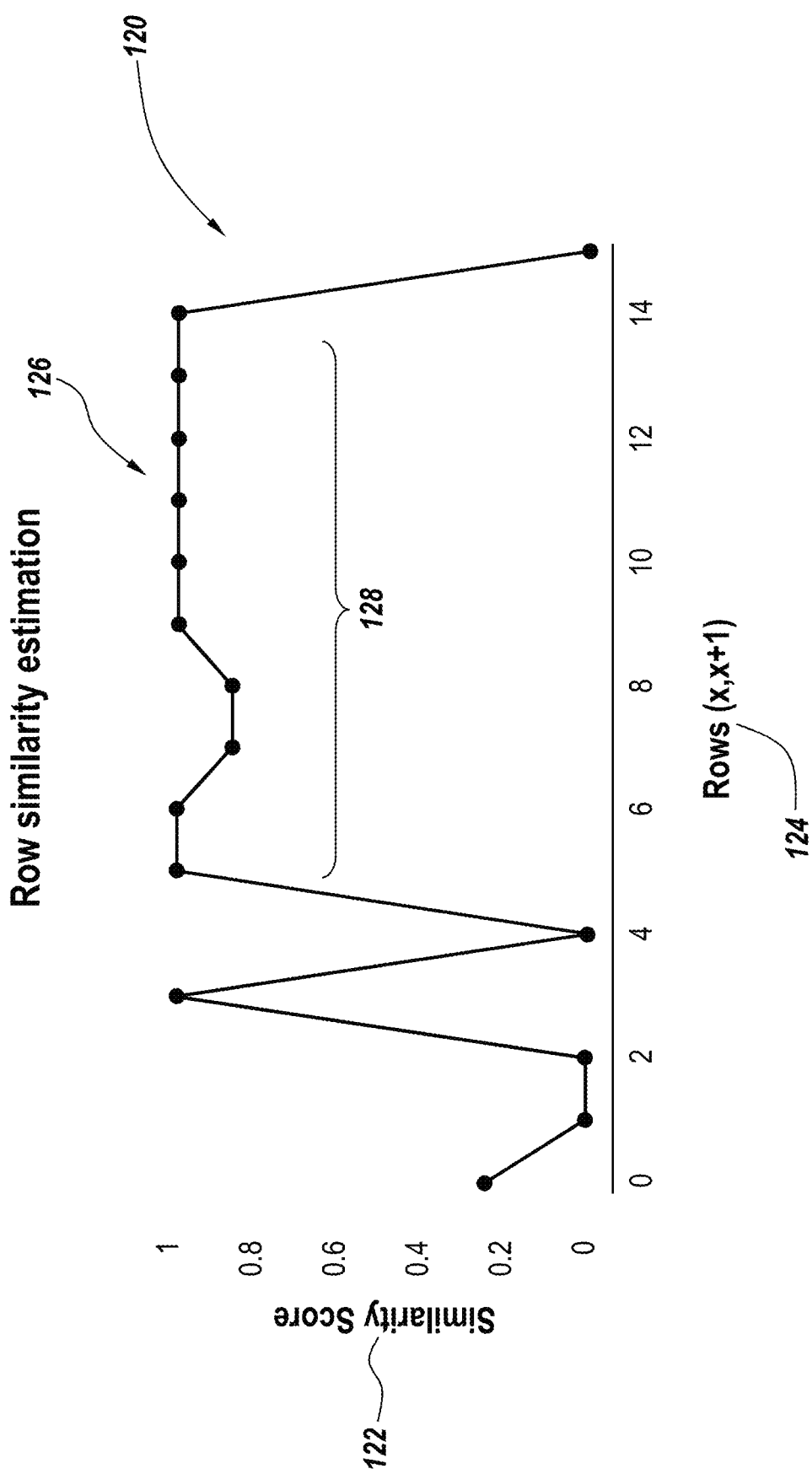
FIG. 9 is a graph generated by the system of FIG. 6 for identifying header data based on similarity data according to the teachings of the present invention.

The data conversion and table identification system 10 of the present invention is also capable of processing and identifying the headers in the columns or rows of the table 110. Specifically, the system 10 includes a table header identification sub-system 90, as shown in FIGS. 6-9. The table header identification sub-system 90 is agnostic or independent of the type or format of the table data employed thereby. The table data 98 generated by the system 10 and which includes row and column data 112, 114 is processed by an extraction unit 92. The extraction unit 92 extracts the row data from the table data 98 and assigns one or more data types for each row 112 in the table 118. The data types can be associated with the type of data set forth in the table cells 116. In the example table 118, the data types assigned to each row can include, for example, year and percentage. The extraction data is then processed by the estimation unit 94, which estimates the similarity between the data types assigned to adjacent rows 112 in the table 118. The estimation unit 94 can employ any known estimation technique, and according to one practice employs a Jaccard similarity coefficient technique. In the Jaccard similarity coefficient technique, the estimation unit 94 determines the similarity between the data in the rows 112 by determining the relative Jaccardian distance between the row data or assigned data types and then determining a Jaccard coefficient between 0 and 1, where 1 corresponds to identical overlap between the rows 112. The identification unit 96 then clusters together rows having similar Jaccard coefficients into clusters, and then identifying the clusters based on similarity as being data rows 140, which are rows having data, or header rows 142, which do not contain pertinent data. The rows 112 in the table 118 are introduced to the table header identification sub-system 90 and corresponding similarity scores are generated by the estimation unit 94 by comparing each row to a previous row (e.g., adjacent rows) in the table 118. FIG. 9 sets forth a graph 120 charting the similarity scores 126 generated by the estimation unit 94 between the rows 112 in the table 118. The Y-axis of the graph corresponds to the similarity score 122 and the X-axis of the graph corresponds to the comparison between adjacent rows (x, x+1) 124. As the similarity scores between adjacent rows is determined, the graph 120 illustrates for example that rows 5 through 14 are clustered together 128 since they are adjacent to each other and exhibit relatively high similarity scores. These rows hence correspond to the data type "date" in the table. Specifically, the rows in the table with date information corresponding to the years 2005-2014 each contain financial data and do not correspond to header rows 142, and rather correspond to the data rows 140. As such, these rows have a high similarity score relative to each other (e.g., about 1). Conversely, the rows that have low similarity scores of about 0.2 and below are not deemed to be similar to the rows in the cluster 128. As such, these rows can be designated or identified as header rows 142 by the identification unit 96.

Hardware System and Configurations

Following below and referenced above are more detailed descriptions of various concepts related to, and embodiments of, a system 10 and associated method for converting source data and identifying a table component of the source data according to the teachings of the present invention. The systems 10, 90 convert source data into a series of pixel data that includes coordinate data, cluster the pixels together along one of the coordinate axes, and then classify the clusters as rows and/or columns of the table. The systems then assign data types to the table data for each row, perform a similarity estimation, and then identify similar patterns so as to distinguish or identify table header data from the remaining table data. The data conversion and identification system 10 and sub-system 90 of the present invention can be implemented in hardware (e.g., firmware), software, or a combination of both. It should be appreciated that the various concepts introduced above and discussed in greater detail below may be implemented in any number of ways, as the disclosed concepts are not limited to any particular manner of implementation or system configuration. Examples of specific implementations and applications are provided below primarily for illustrative purposes and for providing or describing the operating environment of the data conversion and identification system of the present invention.

Figure 10:
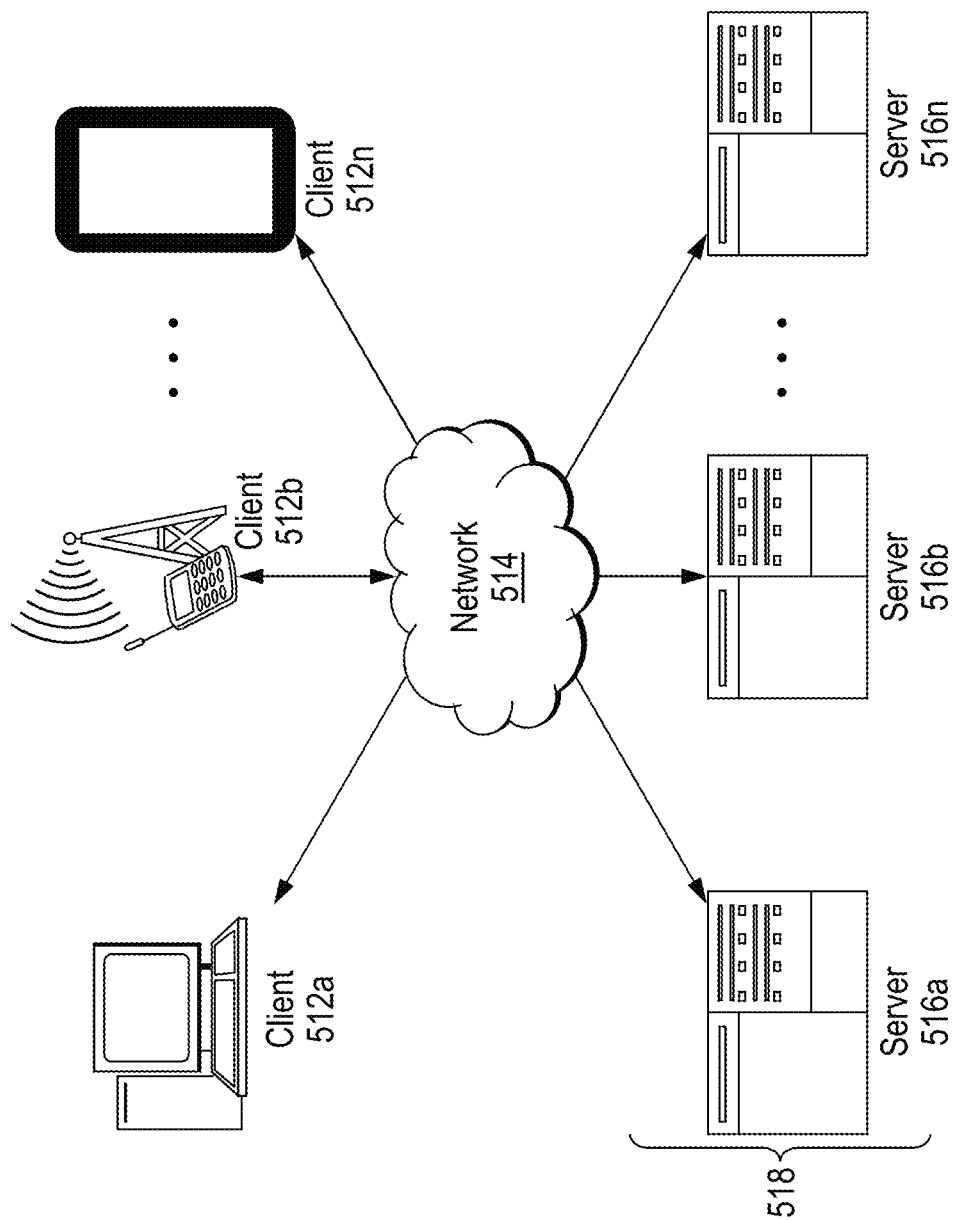
FIG. 10 is a schematic block diagram depicting an embodiment of a network environment comprising client devices in communication with servers through a network arrangement and suitable for implementing the system of FIG. 1 and the system of FIG. 6 according to the teachings of the present invention.

Consistent with the foregoing inventive embodiments, it is helpful to describe aspects of the operating environment as well as associated system components (e.g., hardware elements) in connection with the methods and systems 10, 90 described herein. Referring to FIG. 10, an example embodiment of a network environment suitable for implementing the systems 10 and 90 of the present invention is depicted. In brief overview, the illustrated network environment includes one or more clients 512a-512n (also generally referred to as local machine(s) 512, client(s) 512, client node(s) 512, client machine(s) 512, client computer(s) 512, client device(s) 512, endpoint(s) 512, or endpoint node(s) 512) in communication with one or more servers 516a-516n (also generally referred to as server(s) 516, node 516, or remote machine(s) 516) via one or more networks 514. In some embodiments, a client 512 has the capacity to function as both a client node seeking access to resources provided by a server and as a server providing access to hosted resources for other clients 512a-512n. The clients can be any suitable electronic or computing device, including for example, a computer, a server, a smartphone, a smart electronic pad, a portable computer, and the like, such as the computing device 600. The data conversion and identification system 10 and the sub-system 90 allow users access thereto through the client devices and or servers over the illustrated network.

Although FIG. 10 shows a network 514 between the clients 512 and the servers 516, the clients 512 and the servers 516 may be on the same network 514. In some embodiments, there are multiple networks 514 between the clients 512 and the servers 516. In one of these embodiments, a network 514' (not shown) may be a private network and a network 514 may be a public network. In another of these embodiments, a network 514 may be a private network and a network 514' a public network. In still another of these embodiments, networks 514 and 514' may both be private networks.

The network 514 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 514 may be any type and/or form of network. The geographical scope of the network 514 may vary widely and the network 514 can be a body area network (BAN), a personal area network (PAN), a local-area network (LAN), e.g. Intranet, a metropolitan area network (MAN), a wide area network (WAN), or the Internet. The topology of the network 514 may be of any form and may include, e.g., any of the following: point-to-point, bus, star, ring, mesh, or tree. The network 514 may be an overlay network, which is virtual and sits on top of one or more layers of other networks 514'. The network 514 may be of any such network topology as known to those ordinarily skilled in the art capable of supporting the operations described herein. The network 514 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 514 may be a type of a broadcast network, a telecommunications network, a data communication network, or a computer network.

In some embodiments, the network system may include multiple, logically-grouped servers 516. In one of these embodiments, the logical group of servers may be referred to as a server farm 518 or a machine farm 518. In another of these embodiments, the servers 516 may be geographically dispersed. In other embodiments, a machine farm 518 may be administered as a single entity. In still other embodiments, the machine farm 518 includes a plurality of machine farms 518. The servers 516 within each machine farm 518 can be heterogeneous, and one or more of the servers 516 or machines 516 can operate according to one type of operating system platform (e.g., WINDOWS NT, manufactured by Microsoft Corp. of Redmond, Wash.), while one or more of the other servers 516 can operate according to another type of operating system platform (e.g., Unix, Linux, or Mac OS X).

In one embodiment, servers 516 in the machine farm 518 may be stored in high-density rack systems, along with associated storage systems, and located in an enterprise data center. In this embodiment, consolidating the servers 516 in this way may improve system manageability, data security, the physical security of the system, and system performance by locating servers 516 and high performance storage systems on localized high performance networks. Centralizing the servers 516 and storage systems and coupling them with advanced system management tools allows more efficient use of server resources.

The servers 516 of each machine farm 518 do not need to be physically proximate to another server 516 in the same machine farm 518. Thus, the group of servers 516 logically grouped as a machine farm 518 may be interconnected using a wide-area network (WAN) connection or a metropolitan-area network (MAN) connection. For example, a machine farm 518 may include servers 516 physically located in different continents or different regions of a continent, country, state, city, campus, or room. Data transmission speeds between servers 516 in the machine farm 518 can be increased if the servers 516 are connected using a local-area network (LAN) connection or some form of direct connection. Additionally, a heterogeneous machine farm 518 may include one or more servers 516 operating according to a type of operating system, while one or more other servers 516 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 518 may be de-centralized. For example, one or more servers 516 may comprise components, subsystems and modules to support one or more management services for the machine farm 518. In one of these embodiments, one or more servers 516 provide functionality for management of dynamic data, including techniques for handling failover, data replication, and increasing the robustness of the machine farm 518. Each server 516 may communicate with a persistent store and, in some embodiments, with a dynamic store.

Server 516 may be a file server, application server, web server, proxy server, appliance, network appliance, gateway, gateway server, virtualization server, deployment server, SSL VPN server, or firewall, or any other suitable computing device, such as computing device 600. In one embodiment, the server 516 may be referred to as a remote machine or a node. In another embodiment, a plurality of nodes may be in the path between any two communicating servers. The data conversion and identification system 10 of the present invention can be stored on one or more of the servers 516, and the hardware associated with the server, such as the processor or CPU 530 and 536 and memory 533, 538, and 564 can be employed.

Figure 11:
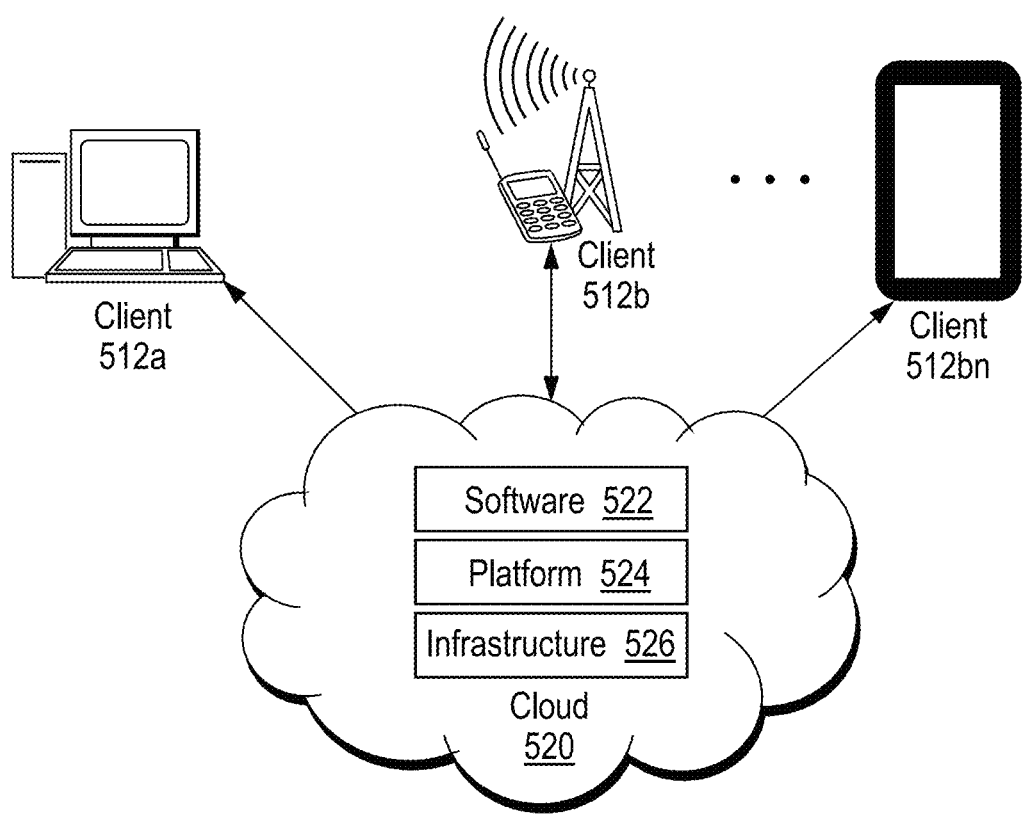
FIG. 11 is a schematic block diagram depicting a cloud computing environment that includes client devices in communication with a cloud service provider arrangement and suitable for implementing the system of FIG. 1 and the system of FIG. 6 according to the teachings of the present invention.

FIG. 11 shows a cloud computing environment for implementing the data conversion and identification system 10 and 90 of the present invention. A cloud computing environment may provide clients 512 with one or more resources provided by a network environment. The cloud computing environment may include one or more clients 512a-512n, in communication with the cloud 520 over one or more networks, an illustrative example of which is network 514. Clients 512 may include in addition to normal or conventional clients, either thick clients, thin clients, and zero clients. A thick client may provide at least some functionality even when disconnected from the cloud 520 or servers 516. A thin client or a zero client may depend on the connection to the cloud 520 or server 516 to provide functionality. A zero client may depend on the cloud 520 or other networks 514 or servers 516 to retrieve operating system data for the client device. The cloud 520 may include back end platforms, e.g., servers 516, storage, server farms or data centers.

The cloud 520 may be public, private, or a hybrid of both. Public clouds may include public servers 516 that are maintained by third parties to the clients 512 or the owners of the clients. The servers 516 may be located off-site in remote geographical locations as disclosed above or otherwise. Public clouds may be connected to the servers 516 over a public network. Private clouds may include private servers 516 that are physically maintained by clients 512 or owners of clients. Private clouds may be connected to the servers 516 over a private network 514. Hybrid clouds 520 may include both the private and public networks 514 and servers 516. The data conversion and identification system 10 and 90 of the present invention can also be implemented in the cloud 20, and hence would be stored as software 522, and utilize the platform 524 and infrastructure 526 of the cloud 520, as well as one or more components of the computing device 600.

The cloud 520 may also include a cloud based delivery, e.g. Software as a Service (SaaS) 22, Platform as a Service (PaaS) 24, and Infrastructure as a Service (IaaS) 26. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 512 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 512 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 512 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 512 may also access SaaS resources through smartphone or tablet applications, including, e.g., Salesforce Sales Cloud, or Google Drive app. Clients 512 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 12A:
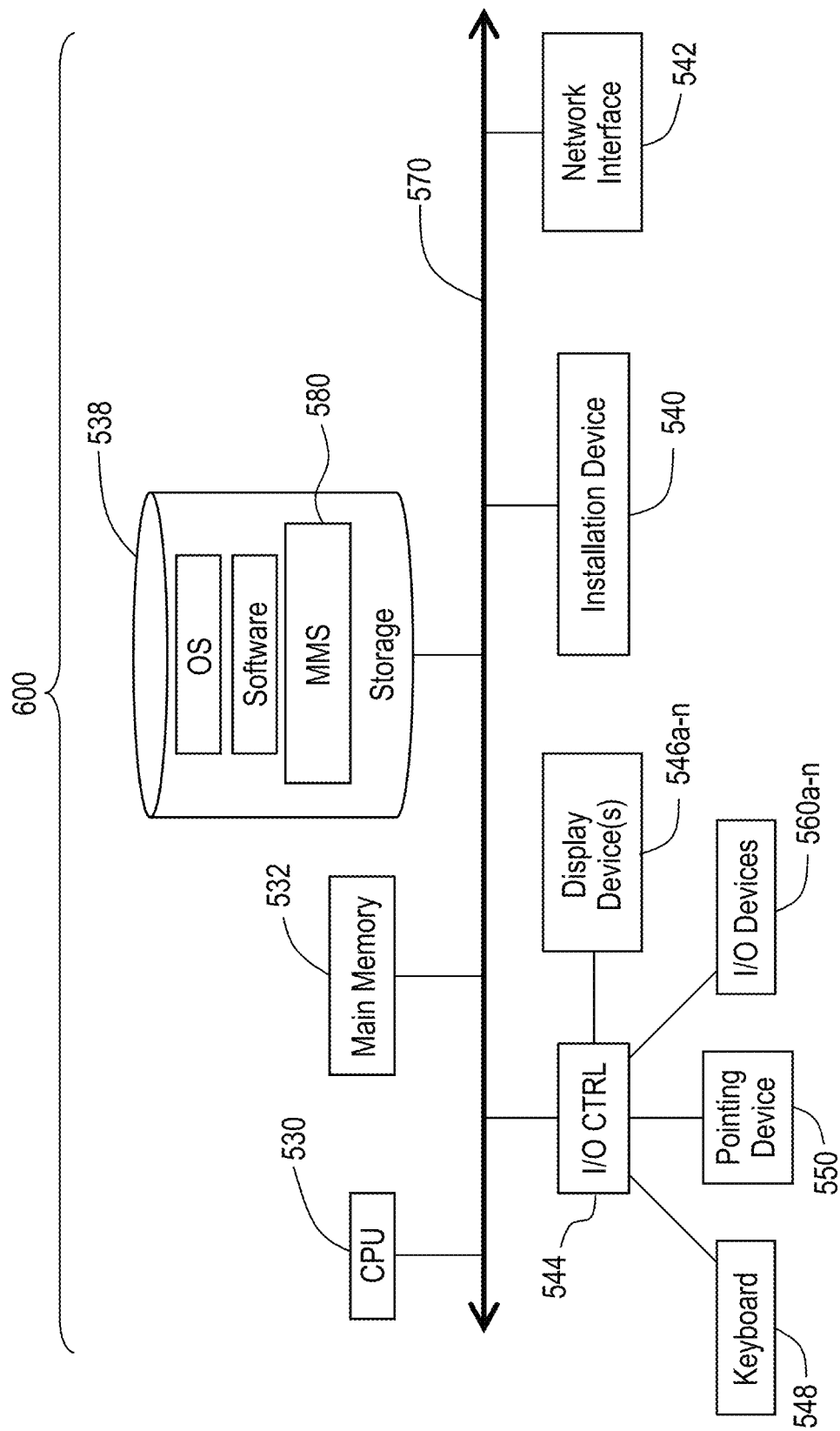
FIGS. 12A and 12B are schematic block diagrams depicting embodiments of computing devices useful for the methods and systems described herein.
Figure 12B:
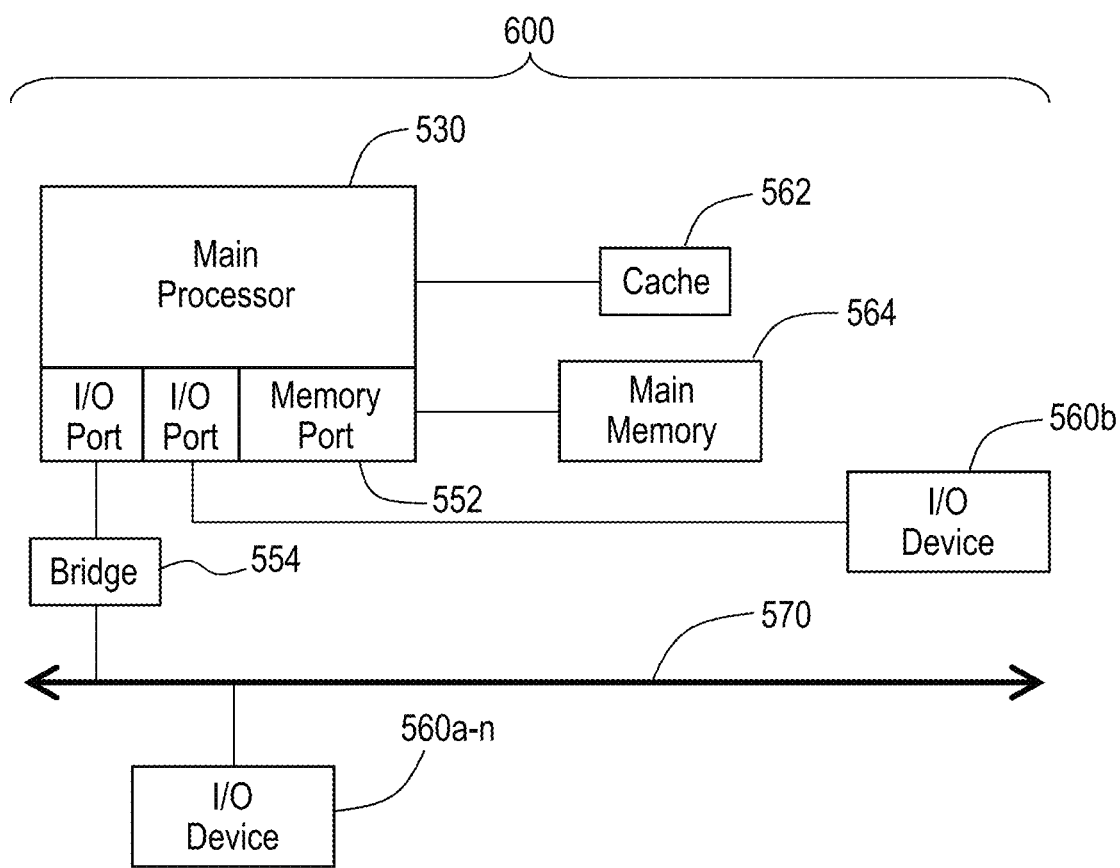

The client 512 and server 516 may be deployed as and/or executed on any type and form of computing device, such as for example a computer, network device or appliance capable of communicating on any type and form of network and performing the operations described herein. FIGS. 12A and 12B depict block diagrams of a computing device 600 useful for practicing an embodiment of the client 512 and/or a server 516. As such, the data conversion and identification system 10 and the sub-system 90 can be implemented through the hardware and software components set forth therein. As shown in FIGS. 12A and 12B, each computing device 600 includes a central processing unit (CPU) 530, and a main memory unit 534. As shown in FIG. 12A, a computing device 600 may include a storage device 538, an installation device 540, a network interface 542, an I/O controller 544, display devices 546a-546n, a keyboard 548 and a pointing device 550, e.g. a mouse. The storage device 538 may include, without limitation, an operating system, and/or software related to the data conversion and identification system 10 and sub-system 90 as described herein. Further, the CPU can perform the processing, calculation, and determination functions, as well as the other functions of the system 10 and sub-system 90. As shown in FIG. 12B, each computing device 600 may also include additional optional elements, e.g. a memory port 552, a bridge 554, one or more input/output devices 560a-560n (generally referred to using reference numeral 560), and a cache memory 562 in communication with the central processing unit 530.

The central processing unit 530 is any logic circuitry that responds to and processes instructions fetched from the main memory unit 564. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 530 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 564 may include one or more memory chips capable of storing data and allowing any storage location to be directly accessed by the processor 530. The main memory unit 564 may be volatile and faster than memory of the storage unit 538. Main memory units 564 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 564 or the storage 538 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 564 may be based on any of the above described memory chips, or any other available memory chips capable of operating as described herein. In the embodiment shown in FIG. 12A, the processor 530 communicates with main memory 532 via a system bus 570 (described in more detail below). FIG. 12B depicts an embodiment of a computing device 600 in which the processor communicates directly with main memory 564 via a memory port 552. For example, in FIG. 12B the main memory 564 may be DRDRAM. The computer executable instructions of the present invention may be provided using any computer-readable media that is accessible by the computing or electronic device 600. Computer-readable media may include, for example, the computer memory or storage unit 564, 538 described above. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 564, 538 is shown within the computing device 600 it will be appreciated that the storage may be distributed or located remotely and accessed via a network or other communication link.

FIG. 12B depicts an embodiment in which the main processor 530 communicates directly with cache memory 562 via a secondary bus, sometimes referred to as a backside bus. In other embodiments, the main processor 530 communicates with cache memory 562 using the system bus 570. Cache memory 562 typically has a faster response time than main memory 564 and is typically provided by SRAM, B SRAM, or EDRAM. In the embodiment shown in FIG. 12B, the processor 530 communicates with various I/O devices 560 via a local system bus 570. Various buses may be used to connect the central processing unit 530 to any of the I/O devices 560, including a PCI bus, a PCI-X bus, or a PCI-Express bus, or a NuBus. For embodiments in which the I/O device is a video display 546, the processor 530 may use an Advanced Graphics Port (AGP) to communicate with the display 546 or the I/O controller 544 for the display 546. FIG. 12B depicts an embodiment of a computer 600 in which the main processor 530 communicates directly with I/O device 560b or other processors 530 via HYPER-TRANSPORT, RAPIDIO, or INFINIBAND communications technology. FIG. 12B also depicts an embodiment in which local busses and direct communication are mixed: the processor 530 communicates with I/O device 560a using a local interconnect bus while communicating with I/O device 560b directly.

A wide variety of I/O devices 560a-560n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. The devices 560a-560n may also include a combination of multiple input or output devices, including, e.g., Apple IPHONE. Additional devices 560a-560n have both input and output capabilities, including, e.g., haptic feedback devices, touchscreen displays, or multi-touch displays. The I/O devices may be controlled by an I/O controller 44 as shown in FIG. 12A. The I/O controller may control one or more I/O devices, such as, e.g., a keyboard 548 and a pointing device 550, e.g., a mouse or optical pen. Furthermore, an I/O device may also provide storage and/or an installation medium 540 for the computing device 600. In still other embodiments, the computing device 600 may provide USB connections (not shown) to receive handheld USB storage devices. In further embodiments, an I/O device 560 may be a bridge between the system bus 570 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 546a-546n may be connected to I/O controller 544. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 546a-546n may also be a head-mounted display (HMD). In some embodiments, display devices 546a-546n or the corresponding I/O controllers 544 may be controlled through or have hardware support for OPENGL or DIRECTX API or other graphics libraries.

In some embodiments, the computing device 600 may include or connect to multiple display devices 546a-546n, which each may be of the same or different type and/or form. As such, any of the I/O devices 560a-560n and/or the I/O controller 544 may include any type and/or form of suitable hardware, software, or combination of hardware and software to support, enable or provide for the connection and use of multiple display devices 546a-546n by the computing device 600. For example, the computing device 600 may include any type and/or form of video adapter, video card, driver, and/or library to interface, communicate, connect or otherwise use the display devices 546a-546n. In one embodiment, a video adapter may include multiple connectors to interface to multiple display devices 546a-546n. In other embodiments, the computing device 600 may include multiple video adapters, with each video adapter connected to one or more of the display devices 546a-546n. In some embodiments, any portion of the operating system of the computing device 600 may be configured for using multiple displays 546a-546n. In other embodiments, one or more of the display devices 546a-546n may be provided by one or more other computing devices 600a or 600b connected to the computing device 600, via the network 514. In some embodiments software may be designed and constructed to use another computer's display device as a second display device 546a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 546a-546n.

Referring again to FIG. 12A, the computing device 600 may comprise a storage device 538 (e.g. one or more hard disk drives or redundant arrays of independent disks) for storing an operating system or other related software, and for storing application software programs such as any program related to the software 580 data conversion and related to the data conversion and identification system 10 and sub-system 90 of the present invention. Examples of storage devices 538 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 538 may be non-volatile, mutable, or read-only. The storage device 538 may be internal and connect to the computing device 600 via a bus 570. Further, the storage device 538 may be external and connect to the computing device 600 via an I/O device 560 that provides an external bus. Some storage devices 538 may connect to the computing device 600 via the network interface 542 over a network 514, including, e.g., the Remote Disk for MACBOOK AIR by Apple. Some client devices 512 may not require a non-volatile storage device 538 and may be thin clients or zero clients 512. The storage device 538 may also be used as an installation device 540, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net. The computing device 600 may also install software or applications from an application distribution platform, such as conventional application stores from Microsoft and Apple.

Furthermore, the computing device 600 may include a network interface 542 to interface to the network 514 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 542 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

The computing device 600 of the sort depicted in FIGS. 11 and 12A may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOK S.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the computing device 600 is a laptop or desktop computer equipped with a web browser and a microphone and speaker system, e.g. a telephony headset. In these embodiments, the computing devices 600 are web-enabled and can receive and initiate phone calls. In some embodiments, a laptop or a desktop computer is also equipped with a webcam or other video capture device that enables video chat and video call. In some embodiments, the computing device 600 is a wearable mobile computing device including but not limited to Google Glass and Samsung Gear.

In some embodiments, the status of one or more machines 512, 516 in the network 514 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the data conversion and identification system disclosed herein.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

We claim:

1. A data processing system for processing source data that includes table data, wherein the table data has associated therewith a plurality of rows and a plurality of columns, comprising
   a conversion unit for converting the table data into machine encoded text data having associated therewith text coordinate data, wherein the coordinate data has a Y-axis component and an X-axis component,
   a pixelation unit for generating from the machine encoded text data a plurality of pixels along the Y-axis component or the X-axis component, wherein the plurality of pixels can have one or more attributes associated therewith,
   a clustering unit for receiving the plurality of pixels from the pixelation unit and in response thereto performing a clustering technique thereon to generate a plurality of clusters of pixels by clustering together one or more pixels from the plurality of pixels according to a similarity of the one or more attributes,
   a computation unit for processing the plurality of clusters of pixels and for determining a maximum extent and a minimum extent for each of the plurality of clusters of pixels, and
   a classification unit for classifying each of the plurality of clusters of pixels received from the computation unit as a selected one of the plurality of rows of the table or a selected one of the plurality of columns of the table, and wherein the maximum and minimum extents of each of the plurality of clusters of pixels correspond to a width of one of the plurality of columns of the table data or a height of one of the plurality of rows of the table data.

2. The data processing system of claim 1, further comprising a preprocessing unit for cropping the source data to identify the table data.

3. The data processing system of claim 1, wherein the conversion unit is configured to convert the table data into the machine encoded text data using an optical character recognition technique.

4. The system of claim 1, wherein the pixelation unit comprises
   a Y-axis converter for selecting and converting the machine encoded data into the plurality of pixels along the Y-axis component, and
   an X-axis converter for selecting and converting the machine encoded data into the plurality of pixels along the X-axis component.

5. The data processing system of claim 4, wherein each of the Y-axis converter and the X-axis converter comprises
   a border determination unit for forming a border around the machine encoded text data, and
   a filling unit for providing additional pixels to the plurality of pixels.

6. The data processing system of claim 4, wherein the computation unit comprises
   a Y-axis calculation unit for determining the maximum and minimum extents for each of the plurality of rows in the table data, and
   an X-axis calculation unit for determining the maximum and minimum extents for each of the plurality of columns in the table data.

7. The data processing system of claim 6, wherein the Y-axis converter of the pixelation unit processes the machine encoded text data along the Y-axis component to generate the plurality of pixels along the Y-axis component,
   wherein the attribute of the plurality of pixels includes the Y-axis component and wherein each of the plurality of clusters of pixels generated by the clustering unit is associated with the plurality of rows of the table data, wherein the Y-axis calculation unit of the computation unit receives the plurality of clusters of pixels and determines the minimum and maximum extents for each of the plurality of rows, and wherein the classification unit classifies each of the plurality of clusters as one of the plurality of rows of the table data.

8. The data processing system of claim 7, wherein the classification unit generates row identification data associated with each one of the plurality of rows of the table data, and wherein the pixelation unit receives and processes the row identification data with the X-axis converter along the X-axis component to determine the plurality of pixels along the X-axis component, wherein the clustering unit processes the plurality of pixels along the X-axis component using the clustering technique to generate a plurality of clusters of pixels along the X-axis component by clustering together one or more pixels from the plurality of pixels, wherein the X-axis calculation unit of the computation unit determines the maximum and minimum extents for each of the plurality of clusters of pixels along the X-axis for determining the maximum and minimum extents for each of the plurality of columns in the table data.

9. The data processing system of claim 8, wherein each of the plurality of columns and the plurality of rows of the table data have a text cell with text data associated therewith, and wherein the X-axis calculation unit further determines the text data present in each of the text cells of each of the columns to be clustered together and determines the clusters that belong in a different column.

10. The data processing system of claim 9, wherein the X-axis calculation unit determines the number of pixels required to represent a single text character (A) in each row of the plurality of rows using the following formula:

$$A = \text{avg number of pixels/length of token}$$

where A is the number of pixels that represent a single character and the token corresponds to a word portion of the text data in the row.

11. The data processing unit of claim 10, wherein the X-axis calculation unit 54 is further adapted to:

determine a pixel length for each token in a row (B), and merge together clusters of pixels within a 2B distance of each other so as to place the tokens within the same column.

12. The data processing unit of claim 11, wherein the X-axis calculation unit further processes the cluster of pixels and determines the maximum extent and the minimum extent for each column of the plurality of columns, and the classification unit classifies each cluster of pixels as a column in the table data.

13. The data processing unit of claim 12, wherein the classification unit generates row identification data corresponding to the plurality of rows and column identification data corresponding to the plurality of columns, wherein the system further comprises a table header and identification sub-system for identifying one or more header rows from among the plurality of rows.

14. The data processing unit of claim 13, wherein the table header and identification sub-system comprises an extraction unit for extracting row data from the row identification data and the column identification data and assigning a data type to each row of the plurality of rows, an estimation unit for estimating a similarity between the data types for each row of the plurality of rows, and an identification unit for identifying the rows with similar data types and identifying the rows with non-similar data types, and designating the rows with non-similar data types as header rows.

15. The data processing system of claim 14, wherein the estimation unit comprises means for implementing a Jaccard similarity technique to extract the row data.

16. The data processing system of claim 1, wherein the clustering technique comprises a density clustering technique.

17. The data processing system of claim 1, wherein the one or more attributes associated with the plurality of pixels comprises at least one of coordinate data and distance data representative of a distance between one or more pixels of the plurality of pixels.

18. A data processing system for processing source data that includes table data, wherein the table data has associated therewith a plurality of rows and a plurality of columns, comprising a conversion unit for converting the table data into machine encoded text data having associated therewith text coordinate data, wherein the coordinate data has a Y-axis component and an X-axis component, a pixelation unit for generating from the machine encoded text data a plurality of pixels along the Y-axis component, wherein the plurality of pixels can have one or more attributes associated therewith, a clustering unit for receiving the plurality of pixels from the pixelation unit and in response thereto performing a clustering technique thereon to generate a plurality of clusters of pixels by clustering together one or more pixels from the plurality of pixels according to a similarity of the one or more attributes, a computation unit for processing the plurality of clusters of pixels and for determining a maximum extent and a minimum extent for each of the plurality of clusters of pixels, and a classification unit for classifying each of the plurality of clusters of pixels received from the computation unit as a selected one of the plurality of rows of the table, and wherein the maximum and minimum extents of each of the plurality of clusters of pixels correspond to a width of one of the plurality of columns of the table.

19. The data processing system of claim 18, further comprising a preprocessing unit for cropping the source data to identify the table data.

20. The system of claim 18, wherein the pixelation unit comprises a Y-axis converter for selecting and converting the machine encoded data into the plurality of pixels along the Y-axis component, and an X-axis converter for selecting and converting the machine encoded data into the plurality of pixels along the X-axis component.

21. The data processing system of claim 20, wherein each of the Y-axis converter and the X-axis converter comprises a border determination unit for forming a border around the machine encoded text data, and a filling unit for providing additional pixels to the plurality of pixels.

22. The data processing system of claim 20, wherein the computation unit comprises
- a Y-axis calculation unit for determining the maximum and minimum extents for each of the plurality of rows in the table data, and
- an X-axis calculation unit for determining the maximum and minimum extents for each of the plurality of columns in the table data.

23. The data processing system of claim 22, wherein the Y-axis converter of the pixelation unit processes the machine encoded text data along the Y-axis component to generate the plurality of pixels along the Y-axis component,
- wherein the attribute of the plurality of pixels includes the Y-axis component and wherein each of the plurality of clusters of pixels generated by the clustering unit is associated with the plurality of rows of the table data,
- wherein the Y-axis calculation unit of the computation unit receives the plurality of clusters of pixels and determines the minimum and maximum extents for each of the plurality of rows, and
- wherein the classification unit classifies each of the plurality of clusters as one of the plurality of rows of the table data.

24. The data processing system of claim 23, wherein the classification unit generates row identification data associated with each one of the plurality of rows of the table data, and wherein the pixelation unit receives and processes the row identification data with the X-axis converter along the X-axis component to determine the plurality of pixels along the X-axis component,
- wherein the clustering unit processes the plurality of pixels along the X-axis component using the clustering technique to generate a plurality of clusters of pixels along the X-axis component by clustering together one or more pixels from the plurality of pixels, and
- wherein the X-axis calculation unit of the computation unit determines the maximum and minimum extents for each of the plurality of clusters of pixels along the X-axis for determining the maximum and minimum extents for each of the plurality of columns in the table data.

25. The data processing unit of claim 24, wherein the X-axis calculation unit further processes the cluster of pixels and determines the maximum extent and the minimum extent for each column of the plurality of columns, and the classification unit classifies each cluster of pixels as a column in the table data.

26. The data processing system of claim 18, wherein the one or more attributes associated with the plurality of pixels comprises at least one of coordinate data and distance data representative of a distance between one or more pixels of the plurality of pixels.

27. A method of processing source data that includes table data, wherein the table data has associated therewith a plurality of rows and a plurality of columns, comprising
- converting the table data into machine encoded text data having associated therewith text coordinate data, wherein the coordinate data has a Y-axis component and an X-axis component,
- generating from the machine encoded text data a plurality of pixels along the Y-axis component or the X-axis component, wherein the plurality of pixels can have one or more attributes associated therewith,
- performing a clustering technique on the plurality of pixels to generate a plurality of clusters of pixels by clustering together one or more pixels from the plurality of pixels according to a similarity of the one or more attributes,
- processing the plurality of clusters of pixels and determining a maximum extent and a minimum extent for each of the plurality of clusters of pixels, and
- classifying each of the plurality of clusters of pixels received from the computation unit as a selected one of the plurality of rows of the table or a selected one of the plurality of columns of the table, and wherein the maximum and minimum extents of each of the plurality of clusters of pixels correspond to a width of one of the plurality of columns of the table data or a height of one of the plurality of rows of the table data.

28. The method of claim 27, further comprising cropping the source data to identify the table data.

29. The method of claim 28, further comprising
- selecting and converting the machine encoded data into the plurality of pixels along the Y-axis component, or
- selecting and converting the machine encoded data into the plurality of pixels along the X-axis component.

30. The method of claim 29, further comprising
- determining the maximum and minimum extents for each of the plurality of rows in the table data, or
- determining the maximum and minimum extents for each of the plurality of columns in the table data.

31. The method of claim 30, further comprising
- processing the machine encoded text data along the Y-axis component to generate the plurality of pixels along the Y-axis component, wherein the attribute of the plurality of pixels includes the Y-axis component,
- associating each of the plurality of clusters of pixels with the plurality of rows of the table data,
- determining the minimum and maximum extents for each of the plurality of rows, and
- classifying each of the plurality of clusters as one of the plurality of rows of the table data.

32. The method of claim 31, further comprising
- generating row identification data associated with each one of the plurality of rows of the table data,
- processing the row identification data along the X-axis component to determine the plurality of pixels along the X-axis component,
- processing the plurality of pixels along the X-axis component to generate a plurality of clusters of pixels along the X-axis component by clustering together one or more pixels from the plurality of pixels, and
- determining the maximum and minimum extents for each of the plurality of clusters of pixels along the X-axis for determining the maximum and minimum extents for each of the plurality of columns in the table data.

33. The method of claim 32, wherein each of the plurality of columns and the plurality of rows of the table data have a text cell with text data associated therewith, the method further comprising
- determining the text data present in each of the text cells of each of the columns to be clustered together and determining the clusters that belong in a different column.

34. The method of claim 33, further comprising determining the number of pixels required to represent a single text character (A) in each row of the plurality of rows using the following formula:

$$A = \text{avg number of pixels/length of token}$$

where A is the number of pixels that represent a single character and the token corresponds to a word portion of the text data in the row.

35. The method of claim 34, further comprising determining a pixel length for each token in a row (B), and merging together clusters of pixels within a 2B distance of each other so as to place the tokens within the same column.

36. The method of claim 35, further comprising processing the cluster of pixels and determining the maximum extent and the minimum extent for each column of the plurality of columns, and classifying each cluster of pixels as a column in the table data.

37. The method of claim 36, wherein the classification unit generates row identification data corresponding to the plurality of rows and column identification data corresponding to the plurality of columns, the method further comprising identifying one or more header rows from among the plurality of rows.

38. The method of claim 37, further comprising extracting row data from the row identification data and the column identification data and assigning a data type to each row of the plurality of rows,
estimating a similarity between the data types for each row of the plurality of rows, and
identifying the rows with similar data types and identifying the rows with non-similar data types, and designating the rows with non-similar data types as header rows.

* * * * *